United States Patent
Niederberger

(10) Patent No.: US 8,534,395 B2
(45) Date of Patent: Sep. 17, 2013

(54) MOBILE CLIMBING ROBOT AND SERVICE SYSTEM HAVING A CLIMBING ROBOT

(75) Inventor: Anton Niederberger, Oberdorf (CH)

(73) Assignee: Niederberger Engineering AG, Oberdorf (CH)

( * ) Notice: Subject to any disclaimer, the term of this patent is extended or adjusted under 35 U.S.C. 154(b) by 224 days.

(21) Appl. No.: 13/120,569

(22) PCT Filed: Oct. 6, 2009

(86) PCT No.: PCT/CH2009/000318
§ 371 (c)(1),
(2), (4) Date: Mar. 23, 2011

(87) PCT Pub. No.: WO2010/040240
PCT Pub. Date: Apr. 15, 2010

(65) Prior Publication Data
US 2011/0180333 A1    Jul. 28, 2011

(30) Foreign Application Priority Data
Oct. 6, 2008  (EP) ..................... 08405255

(51) Int. Cl.
*B62D 51/06*  (2006.01)
*B62D 57/00*  (2006.01)

(52) U.S. Cl.
USPC ............... 180/8.6; 180/8.1; 180/8.2; 180/8.5

(58) Field of Classification Search
USPC ...................... 180/8.1, 8.2, 8.5, 8.6
See application file for complete search history.

(56) References Cited

U.S. PATENT DOCUMENTS

| | | | |
|---|---|---|---|
| 4,662,465 A | 5/1987 | Stewart | |
| 5,551,525 A | 9/1996 | Pack et al. | |

FOREIGN PATENT DOCUMENTS

| | | | |
|---|---|---|---|
| BG | 50 640 A1 | 10/1992 | |
| CH | 670 248 A5 | 5/1989 | |
| EP | 0 157 633 A | 10/1985 | |
| EP | 0 401 120 A | 12/1990 | |
| FR | 2 529 131 A | 12/1983 | |
| JP | 01-160785 A | 6/1989 | |
| JP | 02-109691 A | 4/1990 | |
| JP | 10-086866 A | 4/1998 | |
| WO | 2006/083094 | 8/2006 | |
| WO | 2006/083094 A1 | 8/2006 | |

OTHER PUBLICATIONS

European Search Report for corresponding European Application No. EP 08 40 5255 dated May 25, 2009.
International Search Report for International Application No. PCT/CH2009/000318 mailed Jan. 29, 2010.

*Primary Examiner* — Kevin Hurley
*Assistant Examiner* — Marc A Scharich
(74) *Attorney, Agent, or Firm* — Michael Soderman

(57) ABSTRACT

The mobile climbing robot (15) according to the invention comprises a central joint (3), by which a first leg (1) is connected to a second leg (2). In addition, the robot comprises a first foot (8) which is connected to the first leg (1) by way of a first foot joint for rotation (5) and a first foot joint for tilting (4). A second foot (9) is connected to the second leg (2) by way of a second foot joint for rotation (7) and a second foot joint for tilting (6). A mounting (11) for attaching an implement (10; 12) is disposed on the first foot (8).

14 Claims, 7 Drawing Sheets

8.1, 8.2, 8.3 can also be a magnet, claw or drilling device 9.1, 9.2, 9.3 can also be a magnet, claw or drilling device 9.1, 9.2, 9.3 can also be a magnet, claw or drilling device 8.1, 8.2, 8.3 can also be a magnet, claw or drilling device

MOBILE CLIMBING ROBOT AND SERVICE SYSTEM HAVING A CLIMBING ROBOT

TECHNICAL AREA

The invention relates to a mobile climbing robot and a service system having a climbing robot, which can be used to clean a facade of a building, for example.

BACKGROUND INFORMATION

Publication CH 670 248 A5 makes known an arrangement comprising a vertically movable cabin for working on structures having a curved or planar surface. The arrangement is used in particular for working on large surfaces, such as cooling towers, masonry dams, sides of ships, and the like. The arrangement comprises a cabin for this purpose, which is equipped with a crawler drive having suction cups. Using the crawler drive, the cabin can be moved along the facade of the building, wherein the suction cups are used to increase the adhesion between the crawler drive and the building facade. However, the use of the crawler drive is limited to smooth surfaces having a relatively small curvature. The crawler drive is unable to overcome, or cannot easily overcome stairs and steps in the facade.

Publication U.S. Pat. No. 5,551,525 makes known a climbing robot having a front leg and a rear leg. The two legs are interconnected by way of a knee joint, and each comprises a rotatable foot joint. Although a robot of that type can overcome steps in the building facade, the use thereof for autonomous building cleaning is limited since the freedom of motion thereof is inadequate.

ADVANTAGES OF THE INVENTION

The problem addressed by the invention is that of providing a mobile climbing robot that can climb along any type of surface, such as curved and angled surfaces, overhangs, and ceilings, for example, and can overcome stairs.

The problem is solved by a mobile climbing robot with the features described below.

The mobile climbing robot according to the invention comprises a central joint, by which a first leg is connected to a second leg. In addition, the robot comprises a first foot which is connected to the first leg by way of a first foot joint for rotation and a first foot joint for tilting. Furthermore, a second foot is provided which is connected to the second leg by way of a second foot joint for rotation and a second foot joint for tilting. Finally, the mobile climbing robot comprises a mounting disposed on the first foot for attaching an implement.

Advantageous developments of the invention will be apparent from further possible features described below.

In an embodiment of the climbing robot according to the invention, the first and the second leg are offset laterally relative to one another. This has the advantage that the two legs can be moved past one another, thereby resulting in the greatest possible freedom of motion.

In another embodiment of the climbing robot according to the invention, the first and/or the second foot is equipped with a suction cup. The result is greater adhesion of the climbing robot on the foundation on which the climbing robot moves.

As an alternative or in addition thereto, the first and/or the second foot of the climbing robot can be equipped with a magnet. This is advantageous in particular when the climbing robot is supposed to move on a metallic, magnetic surface. Using the magnet, the extent of the adhesion of the foot or feet on the metallic surface can be controlled in a simple manner. To this end, the magnet is advantageously designed as a switchable electromagnet.

Furthermore, in the case of the climbing robot according to the invention, the first and/or the second foot can be equipped with a claw. This is advantageous in particular when the climbing robot is supposed to move over an uneven surface, such as a heavily structured surface, for example.

To solve the problem it is furthermore provided that, in the case of the climbing robot according to the invention, the first and/or the second foot is equipped with a drilling device. The robot can thus create points on the surface of the object on which it is supposed to move, so it can hold onto these points. However, the drilling device can also be used to perform work on the surface of the object. The robot can therefore drill holes in the wall of the building e.g. at points of a facade of a building that are difficult to access.

According to another feature of the invention, it can be improved further by equipping the climbing robot with electrical or hydraulic drives for moving the legs and/or the feet.

According to another embodiment of the climbing robot according to the invention, a cleaning device is provided as the implement. Using the cleaning device, the robot can then autonomously clean e.g. the facade of the building, the hull or superstructure of a ship, or the surface of a solar or photovoltaic installation.

In addition, a service system is provided that comprises the above-described climbing robot for a surface of an object such as the facade of a building, for example. To this end, the service system has a supply station for supplying the climbing robot. In addition, the service system includes a windlass which can be attached to the object to lower the supply station and secure the climbing robot.

According to a development of the service system, the supply station includes a control unit for controlling the climbing robot.

In addition, the supply station of the service system can include a supply container for cleaning agent.

According to another development of the service system, the supply station includes an energy source for the drive of the climbing robot.

Finally, the service system can be equipped with a camera mounted on the climbing robot, and a display screen for displaying the information delivered by the camera. In addition, the service system can be equipped with a control unit for controlling the climbing robot.

BRIEF DESCRIPTION OF THE DRAWINGS

The invention is explained in greater detail in the following using a plurality of embodiments and with reference to 13 figures.

DESCRIPTION OF THE PREFERRED EMBODIMENTS

Figure 1:
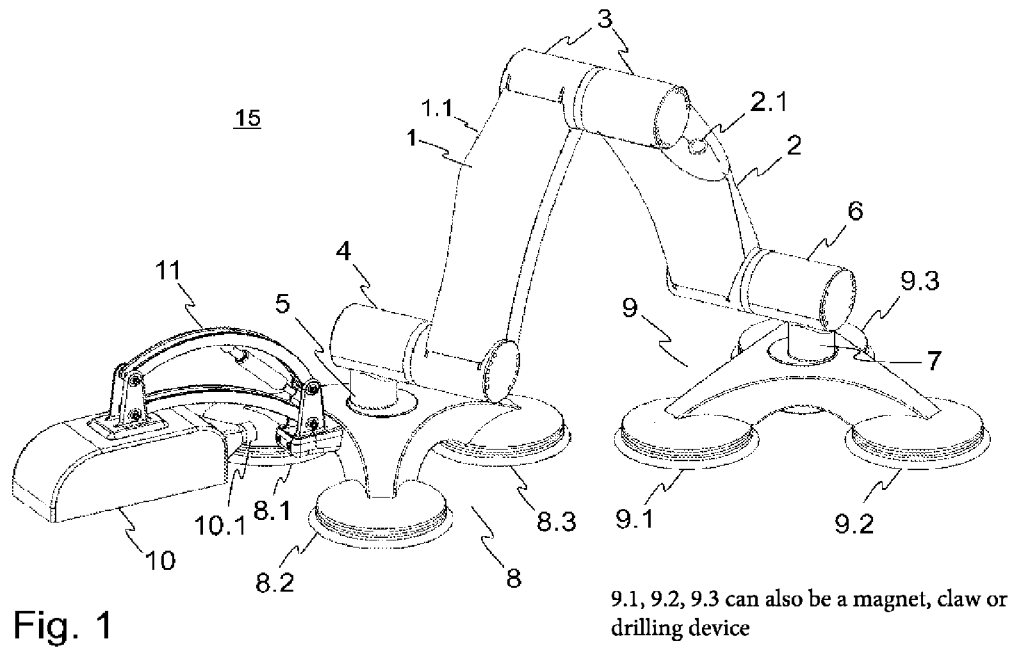
FIG. 1 shows a first possible embodiment of the mobile climbing robot according to the invention, in a three-dimensional view.

A first possible embodiment of mobile climbing robot 15 according to the invention is shown in FIG. 1. Climbing robot 15 comprises two legs 1 and 2 which are interconnected by way of a common joint 3. Joint 3 is disposed and designed between legs 1 and 2 such that legs 1 and 2 are offset laterally relative to one another. This has the advantage that the two legs 1 and 2 can be moved past one another, thereby enabling the robot to stride forward similar to a human.

First leg 1 is connected to a first foot 8 by way of a first foot joint for tilting 4 and a first foot joint for rotation 5. Foot 8 comprises a first suction cup 8.1, a second suction cup 8.2, and a third suction cup 8.3. Suction cups 8.1, 8.2 and 8.3 are controllable and are used to provide sufficient adhesion on a planar surface so that robot 15 is securely adhered thereto. Furthermore, a pivotable device mounting 11 which carries a cleaning device 10 at one end is provided on first foot 8. Cleaning device 10 can be a suction device, for example. The suction device comprises a suction connector 10.1 which can be connected to a hose which is not depicted. Cleaning device 10 can also contain a sponge which is supplied with a cleaning agent by way of connector 10.1.

Second leg 2 is connected to a second foot 9 by way of a second foot joint for tilting 6 and a second foot joint for rotation 7. Second foot 9, similar to first foot 8, comprises a first suction cup 9.1, a second suction cup 9.2, and a third suction cup 9.3.

Electrical, hydraulic, or pneumatic drives are integrated into joints 3, 4, 5, 6 and 7.

Lines can be integrated into the housing of legs 1 and 2. In the embodiment of the robot shown in FIG. 1, these lines are routed out of the legs with a connector 1.1 on leg 1 and a connector 2.1 on the second leg. The lines are interconnectable by way of connectors 1.1 and 2.1 and a hose which is not shown in FIG. 1. These lines can be used as supply lines and/or drain lines. The lines can be used, for example, to carry away the material drawn up by cleaning head 10 or to supply cleaning head 10 with cleaning agent.

In one embodiment, suction cups 8.1 to 9.3 are designed such that they automatically adhere via suction to a planar surface when pressed thereon.

Figure 2:
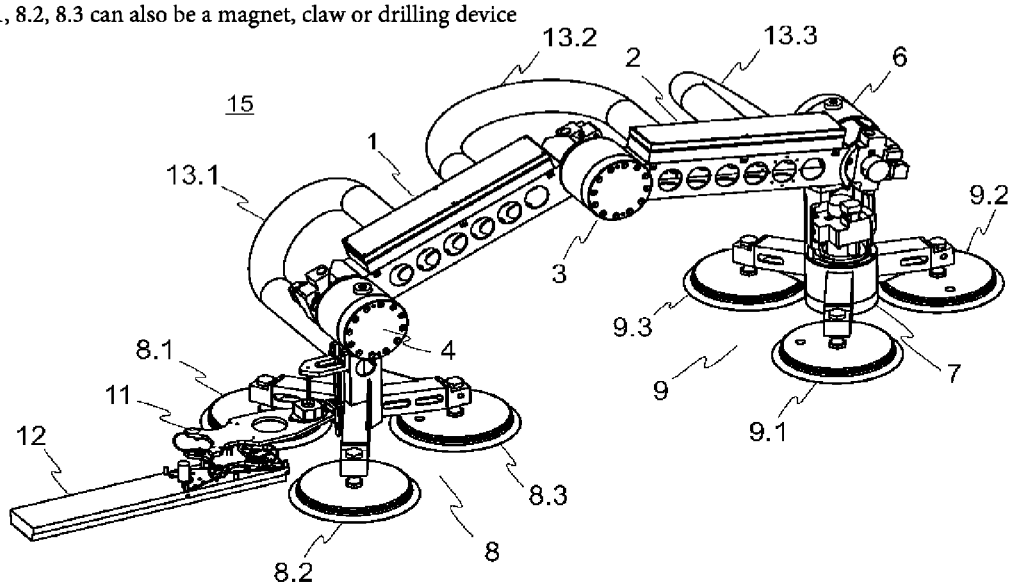
FIG. 2 shows a second possible embodiment of the mobile climbing robot according to the invention, in a three-dimensional view.

Mobile cleaning robot 15 shown in FIG. 2 differs from the cleaning robot shown in FIG. 1 in that it comprises a first hose or a first tube line 13.1, a second hose or a second tube line 13.2, and a third hose or a third tube line 13.3. The drives in joints 3, 4, 5, 6 and 7 can be supplied with hydraulic fluid or compressed air by way of lines 13.1, 13.2 and 13.3. The hydraulic fluid or compressed air is used to supply energy to the drives. An implement 12 designed as a wiper is fastened to mounting 11.

As shown in FIGS. 1 and 2, foot 8 can be equipped with various implements 10, 12.

Cleaning robot 15 is suitable for autonomously cleaning building facades in a dry or wet manner, or for working at points of a building that are difficult to access, such as a cooling tower or a tall building. In addition, cleaning robot 15 is also suitable for cleaning the hull or superstructure of a ship or the surface of a solar installation or a photovoltaic installation.

Instead of the cleaning device, a drilling device can be fastened to foot 8. By way thereof, robot 15 is capable of autonomously drilling holes in the surface of the object on which it is supposed to hold itself, in order to autonomously create retaining points for itself. The retaining points can be used by the robot to increase its hold on the object. The object can be a building, a bridge, or a ship, for example. The drilling device can also be used to drill holes into the masonry of the building for other reasons.

Figure 3:
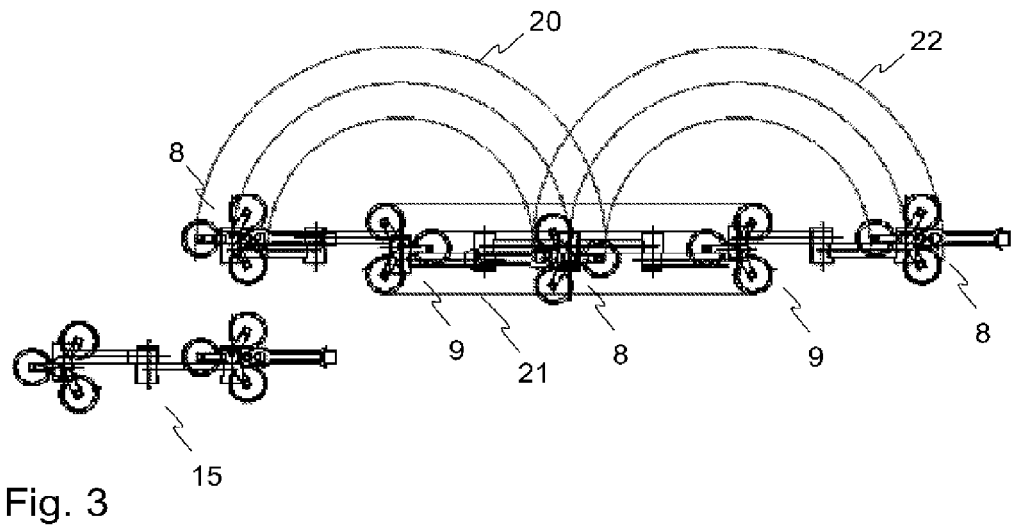
FIG. 3 shows a first possible type of motion of the climbing robot.

Two ways for robot 15 to move are depicted graphically in FIG. 3. In a first step 20, robot 15 rotates by way of revolute joint 7 about foot 9, and so foot 8 makes a circular motion. This motion in the plane of the drawing is depicted as first step 20 in FIG. 3. In a second step 21, foot 9 is detached from the foundation and swiveled past first foot 8 (perpendicular to the plane of the drawing) in a 180° arc. Next, foot 9 attaches itself to the foundation once more using suction. In a third step 22, foot 8 is again swiveled in a circular motion about foot 9. Revolute joint 7 is used primarily once more for this purpose.

Figure 4:
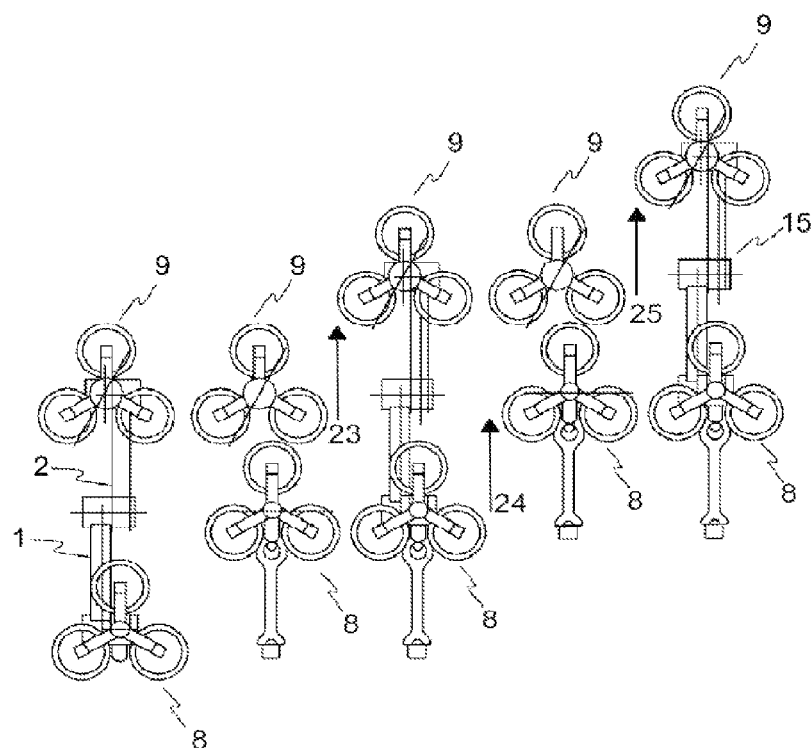
FIG. 4 shows a second possible type of motion of the climbing robot.

Mobile robot 15 can also perform a sequence of motions of the type shown in FIG. 4. In a first step 23, the leg having foot 9 is detached from the foundation and, as shown in FIG. 4, is moved upwardly in the plane of the drawing, in that legs 1 and 2 are moved apart from one another. Foot 9 then attaches itself to the foundation using suction and, in a subsequent step 24, foot 8 is drawn toward it. As soon as foot 8 is securely attached to the foundation once more using suction, next step 25 takes place, which corresponds to step 23 in regard to the sequence of motions.

Figure 5:
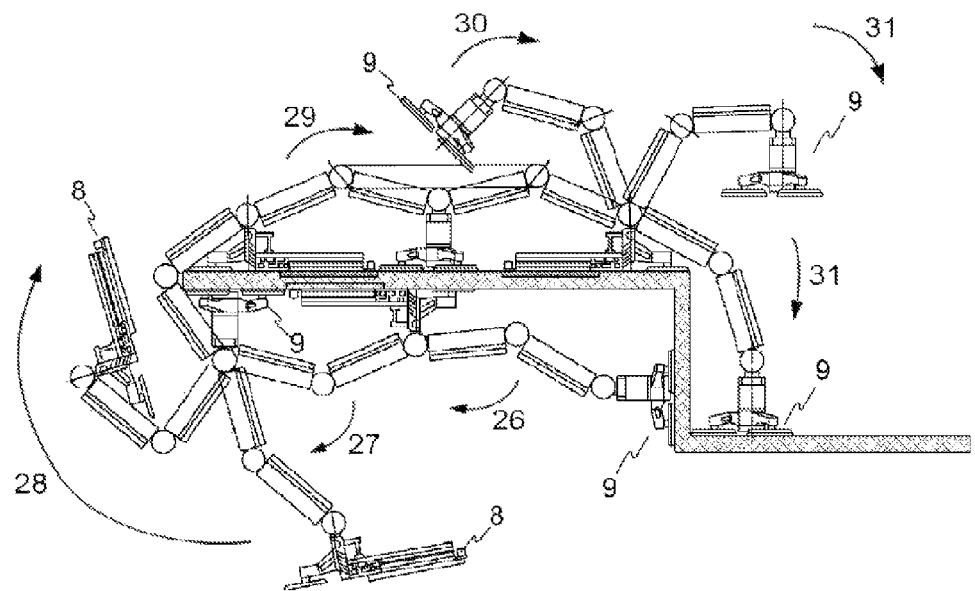
FIG. 5 shows the sequence of motions of the climbing robot for overcoming a step and an overhang.

FIG. 5 shows the sequence of motions of robot 15 when overcoming an overhang (steps 26, 27, 28 and 29) and when overcoming a step (steps 30, 31 and 32).

Figure 6:
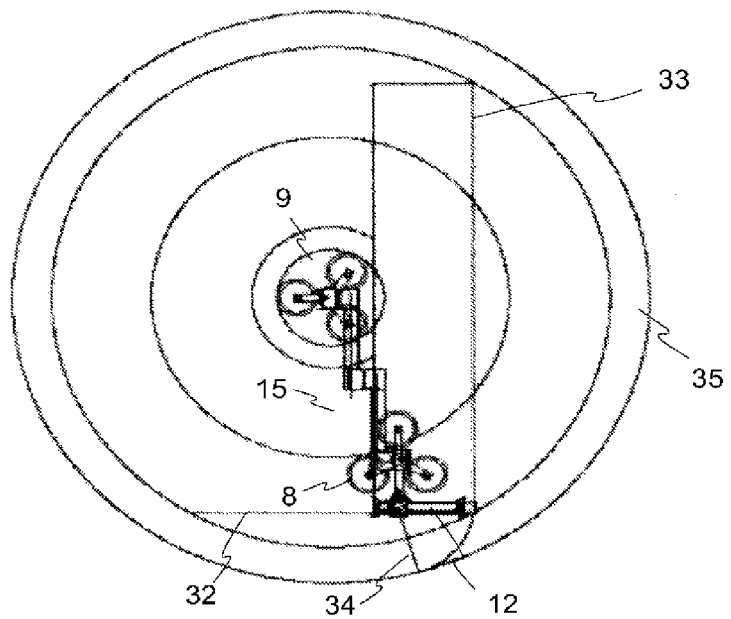
FIG. 6 shows the climbing robot when cleaning a surface without using the revolute joints on the feet.

The radius of action of robot 15 during cleaning is shown in FIG. 6. In the sequence of actions shown in FIG. 6, foot 9 remains still and foot 8 with cleaning device 12 is moved along cleaning surface 35, e.g. in a circle, in that robot 15 rotates about foot 9 using revolute joint 7. Instead thereof, cleaning device 12 can also be moved along a straight trajectory 33. Tilting joints 4 and 6 and central joint 3 are used for this purpose. A plurality of such straight cleaning trajectories 33 can be disposed next to one another in parallel. This is indicated by straight line 32.

Figure 7:
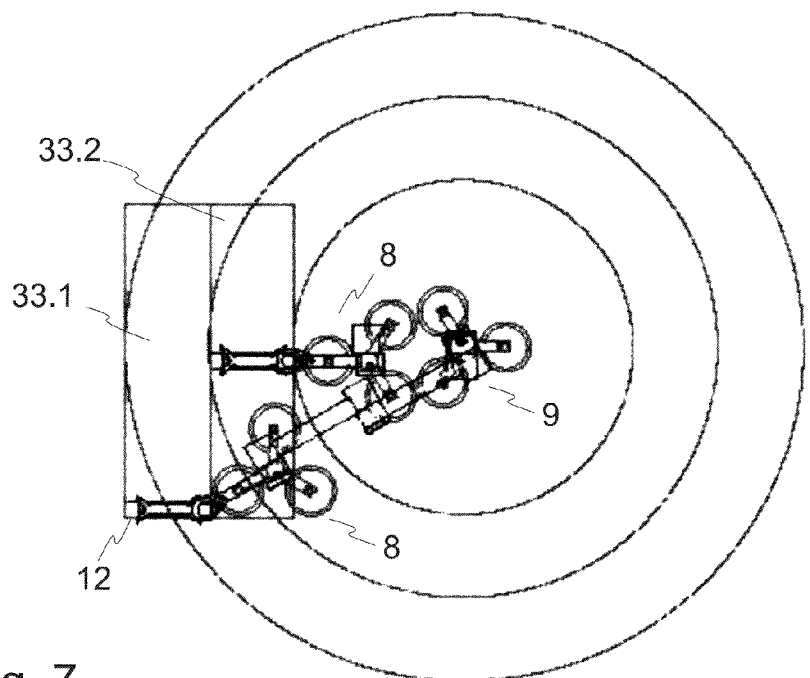
FIG. 7 shows the climbing robot once more when cleaning a surface, wherein the revolute joints on the feet are used in this case.

FIG. 7 shows another pattern of motion of mobile climbing robot 15. For example, the robot can follow two straight trajectories 33.1 and 33.2 which are disposed next to one another in parallel. For this purpose, robot 15 rotates using revolute joint 7 about foot 9 and, simultaneously, the position of foot 8 is adjusted using central joint 3 and revolute joint 5.

Various possible patterns of motion that robot 15 can perform to clean the facade of a building will be explained in the following with reference to FIGS. 8, 9 and 10.

Figure 8:
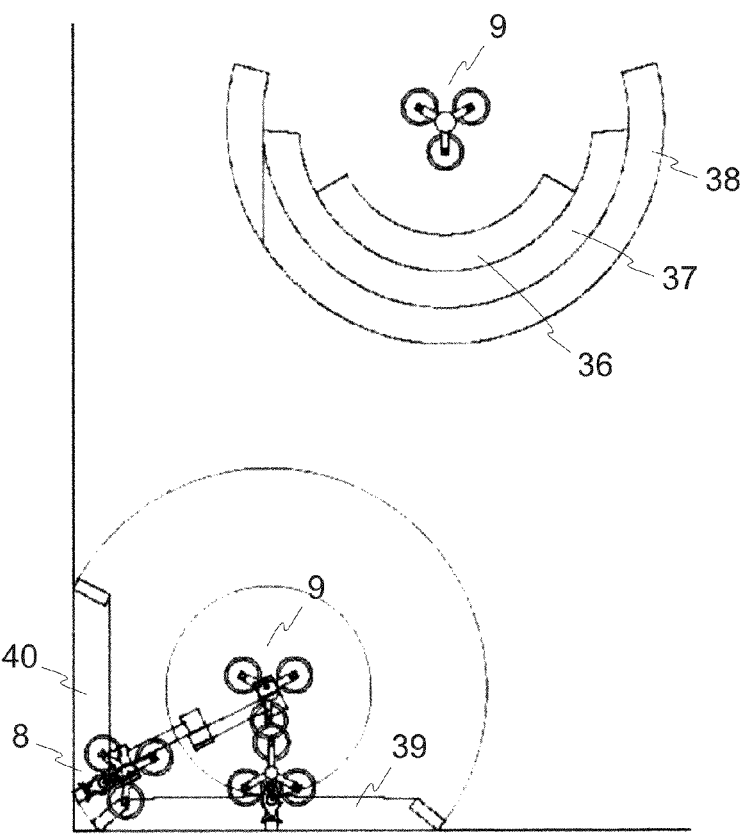
FIG. 8 shows the climbing robot when cleaning a corner and a surface.

FIG. 8 shows a corner of a building, and cleaning robot 15 is located in the vicinity of this corner. As soon as foot 9 becomes securely adhered to the building facade, the cleaning procedure can be started. For this purpose, in a first step, the robot can clean a surface 39 parallel to the lower edge of the building, and, in a second step, a surface 40 that is parallel to the vertical building edge. Next, foot 8 with cleaning device 12 is moved slightly closer to foot 9, and the horizontal and vertical cleaning of the building facade is continued. Another pattern of motion of the cleaning robot is depicted in principle further above in FIG. 8. As indicated, the robot can also clean circular segments 36, 37 and 38.

Figure 9:
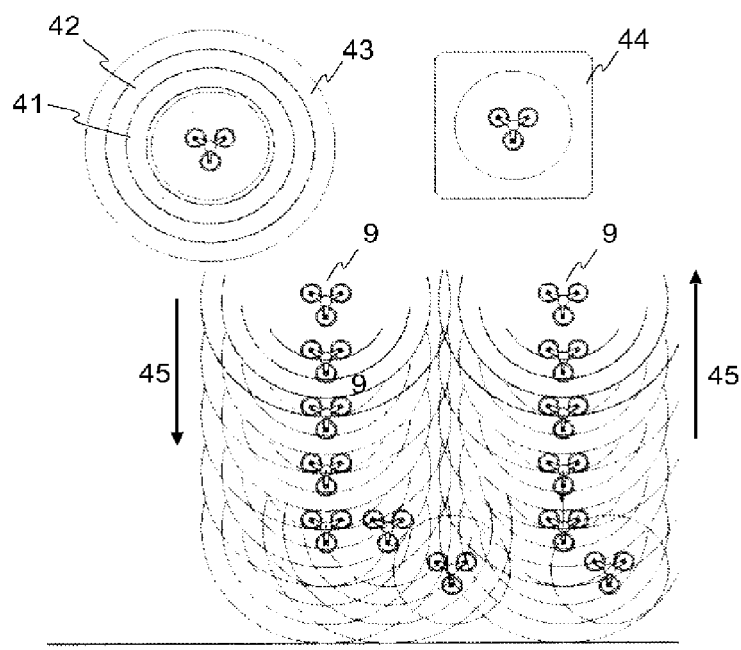
FIG. 9 shows the climbing robot when cleaning a larger surface.

To clean a larger surface on the facade of a building, robot 15—as indicated in FIG. 9 using arrows 45—can be moved and thereby clean the facade using overlapping, circular motions. The special geometry of robot 15 enables it to follow circular cleaning trajectories 41, 42 and 43 and square or rectangular cleaning trajectories 44.

Figure 10:
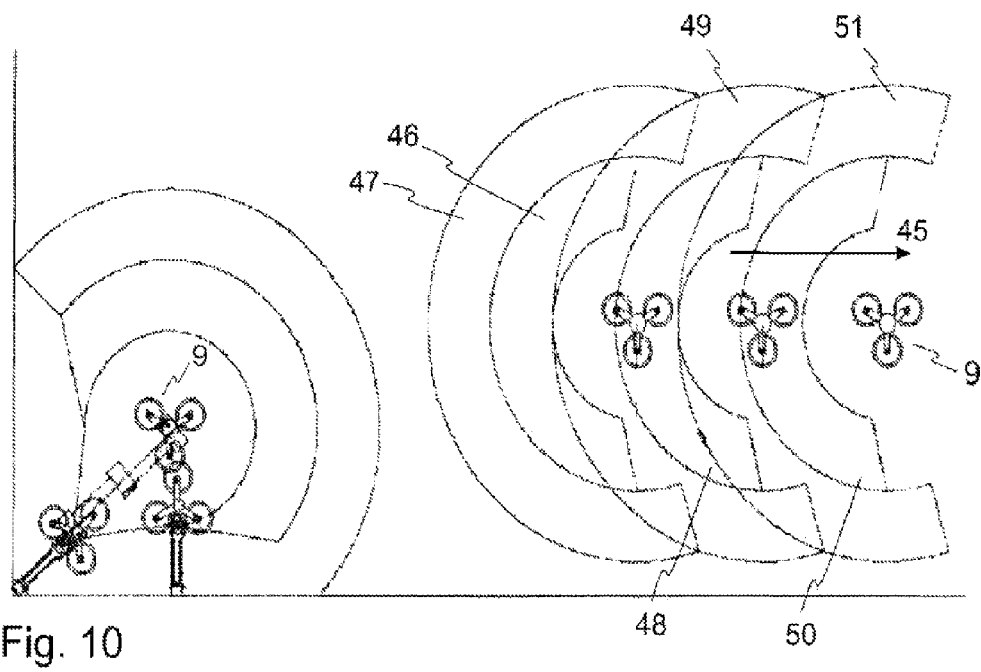
FIG. 10 shows the climbing robot once more when cleaning a corner and a larger surface.

FIG. 10 shows how the robot, once it has cleaned a corner of the facade, continues cleaning in the vicinity of the corner using circular cleaning trajectories. The illustration to the right in FIG. 10 shows how individual cleaning trajectories 46 to 51 can overlap when the cleaning robot follows circular cleaning trajectories 46 to 51.

Figure 11:
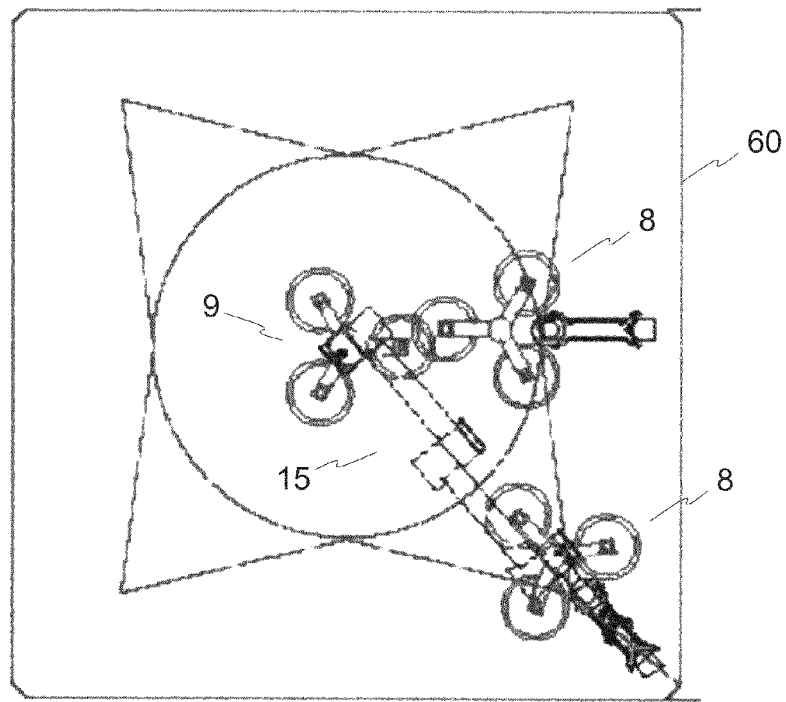
FIG. 11 shows another possible sequence of motions of the climbing robot for cleaning a surface.

Cleaning robot 15 can also clean a square surface 60, as shown in FIG. 11.

Figure 12:
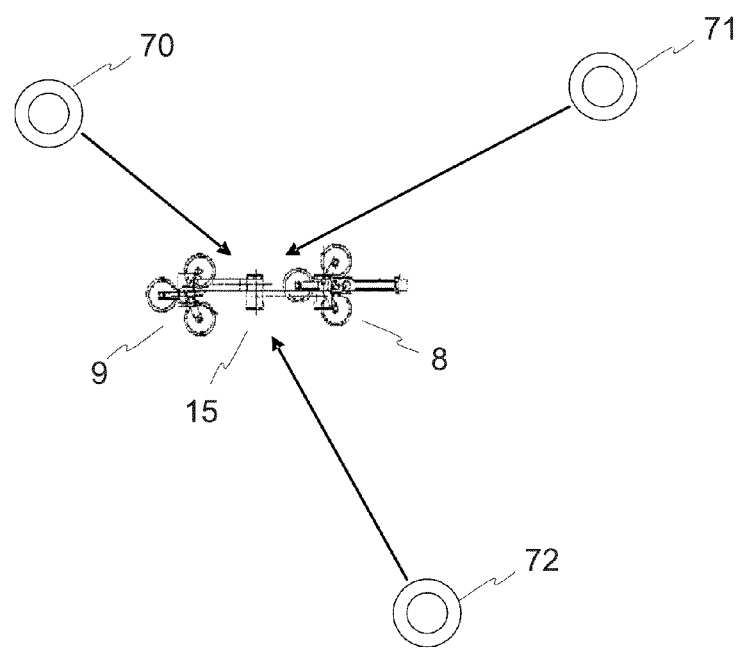
FIG. 12 shows the climbing robot together with a plurality of signal transmitters for controlling the climbing robot.

As shown in FIG. 12, if robot 15 is situated on a large surface, such as the facade of a building, a plurality of signal transmitters 70, 71 and 72 can be provided at various points of the building to transmit control signals and position signals to robot 15.

Figure 13:
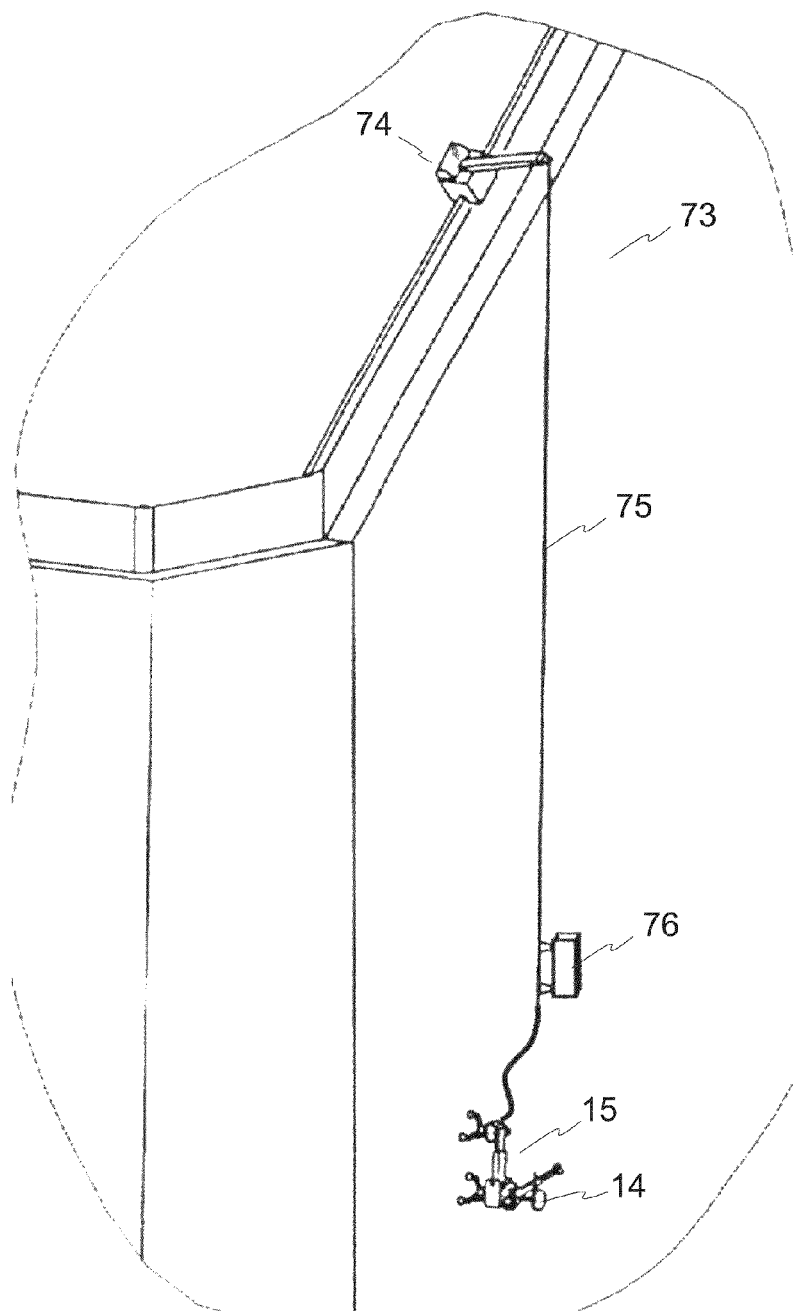
FIG. 13 shows the service system with the climbing robot on the facade of a building, in a three-dimensional view.

A portion of a building 73 is shown in a three-dimensional view in FIG. 13, wherein cleaning robot 15 is part of a service system. The service system comprises a windlass 74 which is disposed in the upper region of building 73 such that it can move along the building. Windlass 74 is used to lower a supply station 76. Supply station 76 can include e.g. an energy source for the drive of robot 15 and a supply container for cleaning agent. Cable 75 is used to hold supply device 76 and as a safety cable for robot 15. Robot 15 can be additionally equipped with a camera 14, by way of which information on the position of the robot can be obtained. Camera 14 can also be used to obtain information about the state of the facade.

The preceding description of the embodiments according to the present invention is used merely for illustrative purposes and not for the purpose of limiting the invention. Various changes and modifications are possible within the scope of the invention without leaving the scope of the invention and the equivalents thereof. For example, the patterns of motion explained with reference to FIGS. 8, 9 and 10 may also be used with other objects such as ships and solar installations, for example.

LIST OF REFERENCE CHARACTERS

1 First leg
2 Second leg
3 Central joint
4 First foot joint for tilting
5 First foot joint for rotation
6 Second foot joint for tilting
7 Second foot joint for rotation
8 First foot
8.1 First suction cup; can also be a magnet, claw or drilling device
8.2 Second suction cup; can also be a magnet, claw or drilling device
8.3 Third suction cup; can also be a magnet, claw or drilling device
9 Second foot
9.1 First suction cup; can also be a magnet, claw or drilling device
9.2 Second suction cup; can also be a magnet, claw or drilling device
9.3 Third suction cup; can also be a magnet, claw or drilling device
10 Cleaning device
11 Device mounting
12 Wiper
13.1 First hose
13.2 Second hose
13.3 Third hose
14 Camera
15 Climbing robot
20 First step
21-31 Steps
32 Baseline
33.1 Cleaning surface
33.2 Cleaning surface
34 Position of the cleaning device
35-40 Cleaning surfaces
45 Direction of motion
46-51 Cleaning surfaces
60 Cleaning surface
70 Signal transmitter
71 Signal transmitter
72 Signal transmitter
73 Building
74 Windlass
75 Cable
76 Supply station

The invention claimed is:

1. A mobile climbing robot,
comprising a central joint, by way of which a first leg is connected to a second leg,
comprising a first foot which is connected to the first leg by way of a first foot joint for rotation and a first foot joint for tilting,
comprising a second foot which is connected to the second leg by way of a second foot joint for rotation and a second foot joint for tilting, and comprising a mounting for attaching an implement disposed on a first foot,
wherein the first leg and the second leg are offset laterally relative to one another.

2. The climbing robot according to claim 1,
wherein the first and/or the second foot are equipped with a suction cup.

3. The climbing robot according to claim 1,
wherein the first and/or the second foot are equipped with a magnet.

4. The climbing robot according to claim 1,
wherein the first and/or the second foot are equipped with a claw.

5. The climbing robot according to claim 1,
wherein the first and/or the second foot are equipped with a drilling device.

6. The climbing robot according to claim 1,
wherein drives are provided for moving the legs and the feet, and
wherein the drives are designed as electrical or hydraulic drives.

7. The climbing robot according to claim 1, wherein the implement is a cleaning device.

8. A method of using the climbing robot according to claim 1, for cleaning an object.

9. A method of using the climbing robot according to claim 8, wherein the object is a building, a bridge, a ship, or a solar installation.

10. A service system having a climbing robot according to claim 1, comprising a supply station for supplying the climbing robot, and comprising a windlass disposed on the object for lowering the supply station and securing the climbing robot.

11. The service system according to claim 10, wherein the supply station comprises a control unit for controlling the climbing robot.

12. The service system according to claim 10, wherein the supply station comprises a supply container for cleaning agent.

13. The service system according to claim 10, wherein the supply station comprises an energy source for the drive of the climbing robot.

14. The service system according to claim 10, comprising a camera disposed on the climbing robot, and comprising a control unit for controlling the climbing robot.

* * * * *